United States Patent
Blodgett et al.

(10) Patent No.: US 9,684,354 B2
(45) Date of Patent: Jun. 20, 2017

(54) REMOTE CUSTOMER RELATIONSHIP MANAGEMENT ACTIVITY WORKSPACE

(71) Applicant: Xerox Business Services, LLC, Dallas, TX (US)

(72) Inventors: Lynn R Blodgett, Salt Lake City, UT (US); Roy G Conlee, Lexington, KY (US); Dale R Johnson, Chesapeake, VA (US)

(73) Assignee: Conduent Business Services, LLC, Dallas, TX (US)

( * ) Notice: Subject to any disclaimer, the term of this patent is extended or adjusted under 35 U.S.C. 154(b) by 113 days.

(21) Appl. No.: 13/955,310

(22) Filed: Jul. 31, 2013

(65) Prior Publication Data
US 2015/0040215 A1    Feb. 5, 2015

(51) Int. Cl.
| | | |
|---|---|---|
| *G06F 21/85* | (2013.01) | |
| *G06F 1/32* | (2006.01) | |
| *G06F 21/81* | (2013.01) | |
| *G08B 13/00* | (2006.01) | |
| *G08B 13/24* | (2006.01) | |

(52) U.S. Cl.
CPC ............ *G06F 1/3209* (2013.01); *G06F 21/81* (2013.01); *G06F 21/85* (2013.01); *G08B 13/00* (2013.01); *G08B 13/2491* (2013.01)

(58) Field of Classification Search
CPC ......... G06F 21/81; G06F 21/85; G08B 13/00; G08B 13/2491
USPC .......................................................... 726/22
See application file for complete search history.

(56) References Cited

U.S. PATENT DOCUMENTS

| | | | |
|---|---|---|---|
| 5,585,839 A | 12/1996 | Ishida et al. | |
| 6,205,716 B1 | 3/2001 | Peltz | |
| 6,614,450 B1 | 9/2003 | Vossler | |
| 7,756,544 B1 * | 7/2010 | Graham | H04W 52/0258 370/310 |
| 8,224,401 B1 * | 7/2012 | Schlichter | 455/574 |
| 2002/0056046 A1 * | 5/2002 | Klein | G06F 1/3218 726/26 |
| 2007/0022090 A1 * | 1/2007 | Graham | 707/1 |
| 2007/0225995 A1 * | 9/2007 | Moore | 705/1 |
| 2009/0241615 A1 * | 10/2009 | Hansknecht | 70/224 |
| 2011/0023113 A1 * | 1/2011 | Munyon et al. | 726/19 |
| 2011/0074570 A1 * | 3/2011 | Feldstein et al. | 340/539.11 |
| 2011/0113472 A1 * | 5/2011 | Fung | H04L 63/0227 726/3 |
| 2011/0181412 A1 * | 7/2011 | Alexander et al. | 340/541 |
| 2012/0278640 A1 * | 11/2012 | Caglianone | 713/323 |
| 2012/0302226 A1 * | 11/2012 | Jesudason | H04W 4/20 455/420 |

(Continued)

OTHER PUBLICATIONS

Venkatraman, "Computer crimes: Taxonomy and prevention strategies", 1997, pp. 58-71.*

(Continued)

*Primary Examiner* — Jason Lee
*Assistant Examiner* — Thaddeus Plecha
(74) *Attorney, Agent, or Firm* — Jones Robb, PLLC (57) ABSTRACT

A secure activity workspace including a monitoring device connected to a power source and a managed router and a monitoring router connected to a communication channel, and the managed router and a power source wherein the monitoring device controls the managed router.

20 Claims, 7 Drawing Sheets

(56) References Cited

U.S. PATENT DOCUMENTS

2013/0167207 A1* 6/2013 Davis ................... G06F 21/316
   726/5
2014/0149758 A1* 5/2014 Rajkotia ..................... 713/310

OTHER PUBLICATIONS

Malcolm Wheatley, "Call Center Security: How to Protect Employees and Customers" May 12, 1998, 5 pages http://www.csoonline.com/article/356064/call-center-security-how-to-protect-employees-and-customers.

* cited by examiner

REMOTE CUSTOMER RELATIONSHIP MANAGEMENT ACTIVITY WORKSPACE

TECHNICAL FIELD

Embodiments are generally related to customer relationship management systems and particularly customer relationship management systems requiring control of confidential data.

BACKGROUND OF THE INVENTION

Dedicated customer relationship management (CRM) systems are utilized by businesses to interface with existing customers requesting information or solicit future customers with offered services. The CRM operations are managed by a business's internal organization or provided by business process outsourcing (BPO) suppliers specializing in CRM services. Services offering marketing, sales and associated analytics focus on future customers, whereas requests from existing customers regarding a product or service's capability or operability are generally handled by call centers. Call centers are complex operations requiring an efficient connection between a customer or client and a call center agent. The centers include numerous agents and supervisors collocated in compressed accommodations with telephonic and computer equipment. Sufficient employee training, techniques and complex systems are provided to insure inquiries are managed in a professional, productive and efficient manner. Inquiries are submitted using various multi-media and data channels to accommodate customers. Multichannel environments provide customers with the ability to interface with CRM agents in the form of voice, mobile/SMS, email, social networking, web form, interactive voice response (IVR) or other communication methods. Service devices, such as computer workstations, provide access to an inquiring client's account, configuration, or other such information to understand the inquiry and determine a solution if warranted. Workstations are connected to central computers containing customer, services and product data, as well as to administrator computers to provide oversight to the process.

Call center supervisors are tasked with managing agents to maintain efficiency, reliability and monitor agent workload. Sophisticated integrated systems provide the tools required to route an incoming customer request with the appropriate agent as well as measure key attributes associated with the request and agent. Agents are monitored (by supervisors and systems) to insure the agent provides support that meets or exceeds pre-defined expectations. Achievement based compensation systems are employed as a variable pay system that ties the achievement of specific metrics measuring quality and quantity of the agent's performance with compensation. Additionally, agents are monitored to prevent unauthorized recordation or disclosure of sensitive information.

Where sensitive information is exchanged, the connection between requestor and agent is required to be secure to avoid leakage of sensitive information that could be damaging to an individual or entity. Sensitive information comprises, but is not limited to, private, confidential, personal identifiable information (PII), classified, financial or medical information. Exchanges are both inbound (requestor to agent) and outbound (agent to requestor) and can include transmission of audible and visual information. Sensitive information can be exposed using CRM equipment such as a display, speaker or printed hardcopy. Currently, CRM services providing support for sensitive information are located in secure facilities to prevent unauthorized exploitation of the sensitive information. Facilities control physical access using security personnel, identification card readers, biometric authentication, and other such devices at security checkpoints located at entrances and exits. Secure areas are designated and monitored for illicit equipment and employee behavior. Paperless environments are created to prevent recordation and removal of sensitive material. Equipment capable of capturing (e.g., audio recorders and cameras) or transmitting (e.g., cell phones, personal digital assistants and smart phones) sensitive information is prohibited in secure areas. Certified CRM equipment is modified to prevent unauthorized use and/or abuse security policies (e.g., disabling internet access, disabling USB ports, eliminating removable digital data storage devices, etc.). Security cameras, one-way mirrors, call and workstation monitoring are commonplace in CRM facilities. Moreover, CRM systems employing speech analytics technology listen to agent calls in order to identify additional training opportunities and improve agent performance.

Examples of industries requiring customer relationship management services providing support of sensitive information include: medical, insurance, pharmaceutical, legal, financial and banking.

Turnover of call center employees is increasingly problematic due to increased workloads, low skilled workforce, unsafe environment, high stress, low compensation and poor working conditions. Poor lighting, excessive noise, cramped work areas and a lack of privacy exacerbate working conditions. Therefore there exists a need for an improved work environment with facilities to support CRM functions.

The demands of a global marketplace have introduced additional problems. To provide adequate support, customer relationship management facilities are operated and staffed on a 24-hour basis. Some agents are assigned overnight shifts requiring entry and/or exit of the CRM facilities in the middle of the night when crime rates are elevated. To minimize crime, CRM facilities are designed with access controls and cameras in well-lit and staffed parking lots to protect their employees.

Although CRM call center support is used as an example designs herein are applicable to other work environments. The embodiments herein provide the integration of remote work environments, monitoring of workers and data security systems and methods.

Two-way conferencing using secure, modular and movable enclosures are known in the industry. The enclosures are constructed of soundproofing material to prevent unauthorized personnel located outside of the enclosure from hearing conversations held inside the enclosure. Physical access is controlled using locking mechanisms and security features such as magnetic card readers. Equipment security is provided using dedicated equipment lockers or closets to prevent equipment theft. Additionally, metal sensors are used to prevent prohibited physical items from leaving the enclosure.

Based on the foregoing, it is believed that a need exists for an improved system and method for managing sensitive information transactions in an improved remote customer relationship activity workspace.

BRIEF SUMMARY

The following summary is provided to enable an understanding of inventive and novel structures unique to the disclosed embodiments and is not intended to be a full description. The entire specification, claims, drawings, and abstract should be considered to completely understand the various aspects of the embodiments.

It is, therefore, one aspect of disclosed embodiments to provide for an improved managed communication system and method associated with an activity workspace.

It is another aspect of disclosed embodiments to provide for an improved monitoring system and method associated with an activity workspace.

It is a further aspect of the disclosed embodiments to provide for an improved system and method for controlling sensitive information associated with an activity workspace.

The aforesaid aspects and benefits can now be realized as described herein. Data transmissions to an unsecure location can be contained using a monitoring system in conjunction with a managing system. The monitoring system provides security detection of an activity workspace's exterior as well as monitoring ability to the activity workspace's interior. A monitoring device detects a potential security breach using a sensor to determine if the activity workspace has been opened. Penetrating the activity workspace through an intended entrance or other opening, such as a vent or window, creates a potential security breach and requires preventative measures. Preventative measures include muting audible sound and other data originating from the activity workspace or elsewhere to the activity workspace. This is accomplished through the control of the managing system by the monitoring device. The monitoring system provides unaffected capability between the activity workspace and another location such as a CRM management system.

In another embodiment, a sensor is used to determine the presence of an object or person, which could result in a breach of the activity workspace.

One specific embodiment herein is a system that monitors an access port to an activity workspace to determine which devices to disable to prohibit the exposure of sensitive information outside the activity workspace.

BRIEF DESCRIPTION OF THE DRAWINGS

Various exemplary embodiments of the systems and methods are described in detail below, with reference to the attached drawing figures, in which.

DETAILED DESCRIPTION

The embodiments now will be described more fully herein with reference to the accompanying drawings, in which illustrative embodiments of the invention are shown. The system of the present invention will be described in connection with a customer relationship management (CRM) service, specifically a call center. A call center environment is used as an exemplary model and not intended to limit the applicability of the current invention. Other situations involving communication between two or more parties requiring secure management of communications containing sensitive information are applicable to the present invention.

Definitions

Customer Relationship Management—business strategy for managing a company's interactions with current and future customers.

Call Center—resource provided to a company's current and future customers for relaying business information, resolving problems, generating new business, or responding to inquiries.

Sensitive Information—material containing personal or business data, facts, statistics, records, or other such information which is not intended for public availability.

Monitoring Device—sensing device for detecting the condition of an opening to the workspace or presence of individual(s) near the workspace. Exemplary devices include, but are not limited to, ultrasonic sensor, infrared sensor, and interlock switches.

Monitoring Router—Communication switch used to regulate data communication between multiple points. A monitoring router is achieved using a dedicated device or integrated in a general-purpose computer or system.

Managed Router—Communication switch used to enable data communication between monitoring router and service device(s).

Service Device—Equipment used to conduct business such as computer, terminal, and/or phone.

Service Outlet—Regulated and controlled power source for service devices requiring power.

Figure 1:
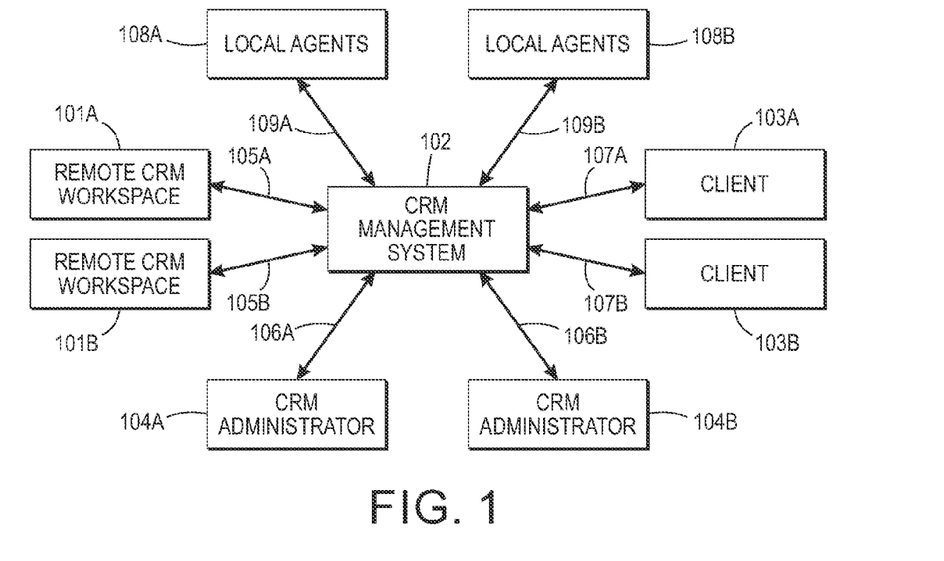
FIG. 1 illustrates a schematic view of the remote CRM system with other systems as disclosed in the embodiments.

The configuration of one embodiment of the system of the present invention is depicted in FIG. 1. As illustrated, CRM management system 102 is connected to remote CRM workspace 101A and remote CRM workspace 101B through communication links 105A and 105B, respectively. Additionally, CRM management system 102 is also connected to CRM administrator 104A and CRM administrator 104B through communication links 106A and 106B, respectively, client 103A and client 103B through communication links 107A and 107B, respectively, and local agents 108A and local agents 108B through communication links 109A and 109B, respectively. Any number of remote CRM workspace (101A and 101B), CRM administrator (104A and 104B), client (103A and 103B) and local agents (108A and 108B) can be communicatively connected to CRM management system 102.

Each of communication link 105A, 105B, 106A, 106B, 107A, 107B, 109A, and 109B are ones suitable to enable transmission of audio, video and/or digital information to enable communication between remote CRM workspace 101A and CRM management system 102. Ethernet or other communication standards such as Integrated Services Digital Network (ISDN) are capable of serving multiple simultaneous connections in any combination of data, voice, video, and fax over a single line. An ISDN enabled communication system provides a means for multiple devices to be serviced concurrently. One skilled in the art recognizes alternatives to ISDN such as Digital Subscriber Lines (DSL), Leased Lines, Fiber-to-the-x (FTTx), Broadband over Power Line (BPL), Wireless Broadband, Satellite Broadband, or Mobile Broadband. Other communication methods, albeit with somewhat inferior capability, include Public Switched Telephone Network (PSTN) and Plain Old Telephone Service (POTS). The use of a communication method is not intended to limit the usefulness of the present invention.

The connections 105A, 105B, 106A, 106B, 107A, 107B, 109A, and 109B between each of remote CRM workspace 101A, remote CRM workspace 101B, CRM administrator 104A, CRM administrator 104B, client 103A, client 103B, local agents 108A and local agents 108B, respectively, to CRM management system 102 are not required to be of the same type. That is, connection 105A could be of type ISDN, whereas the connection 107A could be of type POTS. Present CRM management systems provide hardware and software components to interface with a variety of communication protocols and CRM management system 102 is designed to handle multiple communication standards, protocols and connections. Additionally, CRM management system 102 provides call routing to enable a client 103A to establish a communication path with a CRM agent (101A, 101B, 108A or 108B) and when needed, a CRM administrator (104A or 104B). There is no consideration regarding the location of the elements in FIG. 1 as each element could be separated by a distance or collocated. Moreover, as illustrated, CRM management system 102 is capable of serving more than one remote CRM workspace 101A and 101B, more than one client 103A and 103B, more than one CRM administrator 104A and 104B, and more than one local agent 108A and 108B.

The invention includes the flexibility of operating in a dedicated mode, such as an enclosure described below, or a modular mode which can be used to adopt an existing workspace into a secure workspace. In the modular mode, workspace apparatus is equipped in a kit form with managing and monitoring functionality to enable transformation of a non-secure workspace into a secure workspace. The modular mode includes minor modifications of a non-secure workspace including, but not limited to, strategic placement of workspace apparatus, connection of monitoring device(s) to existing structures or use of auxiliary normally present monitoring devices.

Directing attention to FIG. 2A, an exemplary remote CRM workspace 200 will be described. In the current embodiment, remote CRM workspace 200 is equipped with four walls, a ceiling (not shown) and a floor (not shown) to create an enclosure. The material used to construct the walls, ceiling and floor are that of adequate sound dampening material to sufficiently prevent sound from travelling through them. An entrance with a door 201 is installed in at least one of the walls to allow physical access to the remote CRM workspace 200 via the entrance. The type of door 201 is not of particular importance, however the embodiment illustrates a single door hinged to the enclosure's walls positioned at the entrance. The doorway is suitable to allow access to a person walking through the entrance or rolling while seated in a wheelchair. Other door styles are contemplated such as sliding, folding, overhead and rotating.

An exemplary enclosure is the Vpod™ V1 manufactured by Vpod Solutions. A Vpod™ V1 enclosure is a standalone fully integrated point-to-point video conferencing environment constructed of acoustic panels installed to reduce reverberation. It is designed for use with high definition video conferencing equipment and provides a consistent video conferencing environment. Access to the enclosure is accomplished using a pocket door. The enclosure is equipped with sufficient lighting, providing both daylight lighting via ceiling window and powered LED lamps. Lighting and an integrated ventilation system is controlled using a passive infrared (PIR) sensor to detect enclosure occupancy. Also included in the enclosure are a microphone, speaker, video camera and a high definition liquid crystal display (LCD) screen for video conferencing. The enclosure requires 13 amp electrical power and access to a network using category 5e unshielded twisted pair. A seat and desk are integrated to provide an efficient work area during teleconferences.

As noted previously, Vpod™ V1 manufactured by Vpod Solutions is an exemplary enclosure. To practice the system and method of the present invention, enclosures designed or manufactured by alternate suppliers can be substituted. Additionally, a suitable enclosure such as a room, booth, berth, or closet can be substituted. Any enclosure that provides privacy and the ability to monitor physical access is a usable substitute requiring minor modifications to make use of the invention.

Operation of the sensors 202A, 202B, 202C, 202D, 202E and 202F of FIG. 2A-FIG. 2F will now be described.

Figure 2A:
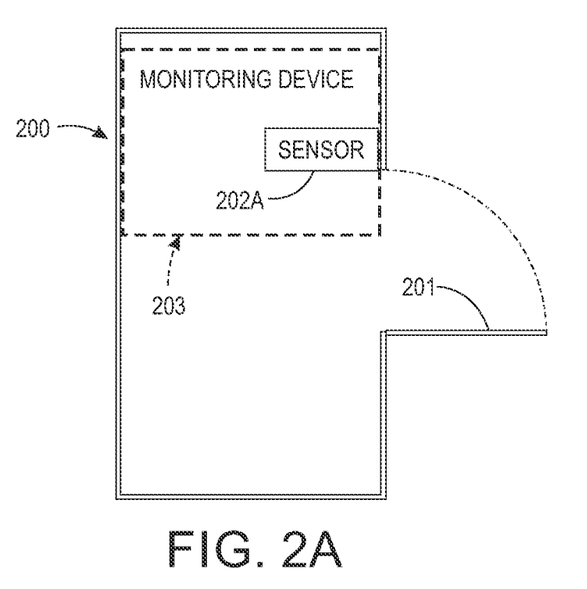
FIG. 2A illustrates a graphical representation of the remote CRM system detection monitoring device in accordance with the embodiments.
Figure 2B:
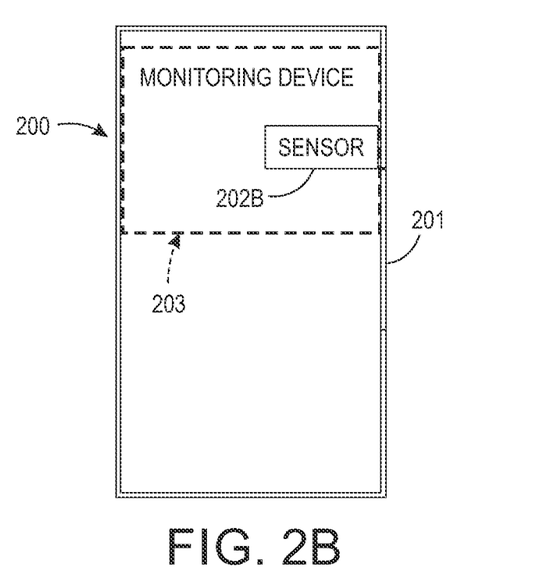
FIG. 2B illustrates a graphical representation of the remote CRM system detection monitoring device in accordance with the embodiments.
Figure 2C:
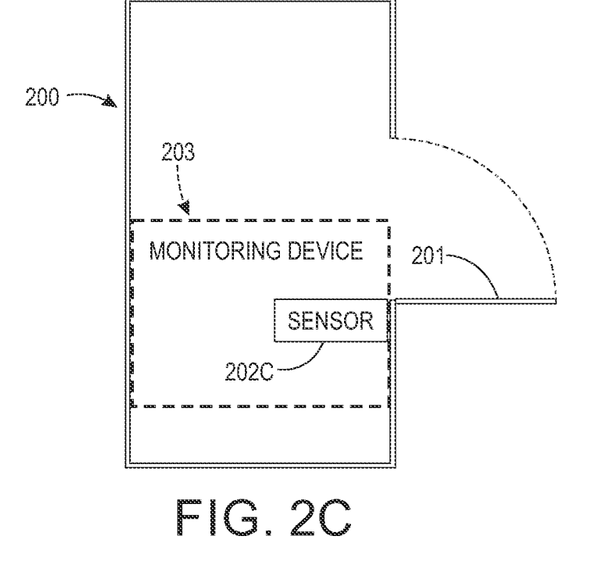
FIG. 2C illustrates a graphical representation of the remote CRM system detection monitoring device in accordance with the embodiments.
Figure 2D:
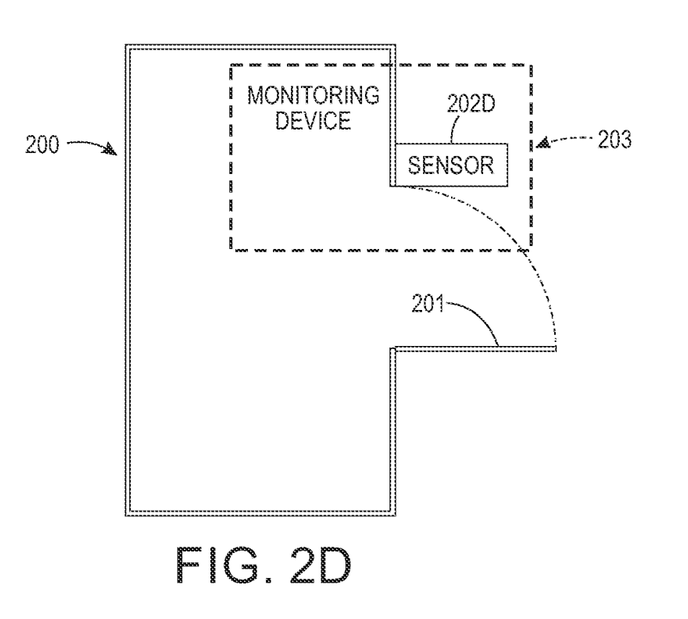
FIG. 2D illustrates a graphical representation of the remote CRM system detection monitoring device in accordance with the embodiments.

Referring to FIG. 2A as well as FIG. 2B, sensor 202A and 202B are installed to monitor the state of the door 201. Monitored states include but are not limited to open, as depicted in FIG. 2A, and closed, as depicted in FIG. 2B, and also include other conditions such as ajar or agape. Additional sensing is contemplated such as detection of interaction with the door handle and proximity sensing to determine if someone has made contact with the door 201. The sensor 202A can be attached to the door 201 components (e.g., stiles, rails or latch), area around the door or doorframe (e.g., jamb, sill, or lintel) or other components of the enclosure such as the walls. FIG. 2C illustrates a hinge sensor and FIG. 2D illustrates a sensor located outside the enclosure. Those skilled in the art recognize a multitude of sensors which can be used to monitor the state of a door including switches, intrusion sensing technology (e.g., aJ-Orion™ security system), but not limited to: push-button door mechanical switch; roller plunger mechanical switch; magnetic contact reed switch; door hinge mechanical switch; or a door hinge magnetic switch. Additional sensors are used for supplementary portals such as window(s), skylight(s), vent(s) or other such openings that would allow access to audio or video inside the enclosure.

Now referring to FIG. 2E and FIG. 2F, the use of a proximity sensor 202E and sensor 202F will be explained. Proximity sensors are used to detect the presence of nearby objects without any immediate contact. Sensing is accomplished by comparing changes of a returned signal from an emitted electromagnetic field or a beam of electromagnetic radiation. Common forms of proximity sensors emit infrared electromagnetic radiation or ultrasonic waves and sense the return signal. In these embodiments, sensor 202E is positioned inside the enclosure and sensor 202F is positioned outside the enclosure.

Figure 2E:
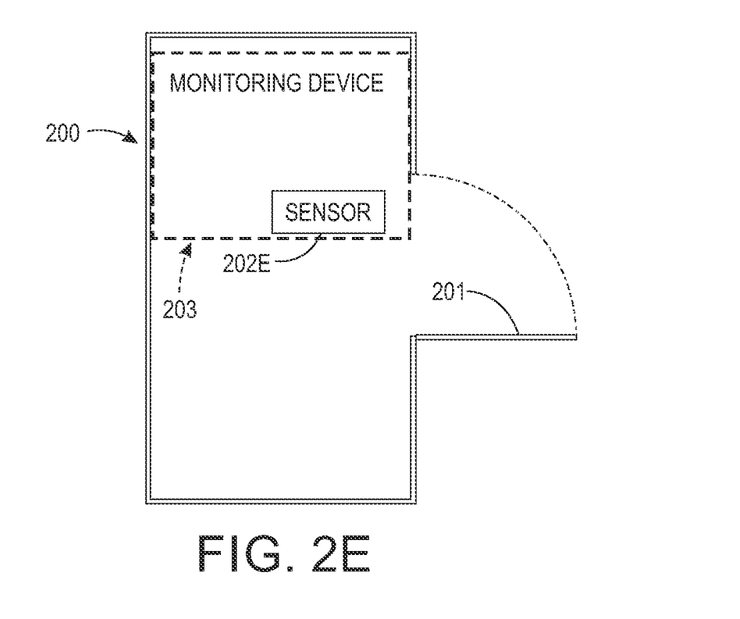
FIG. 2E illustrates a graphical representation of the remote CRM system detection monitoring device in accordance with the embodiments.
Figure 2F:
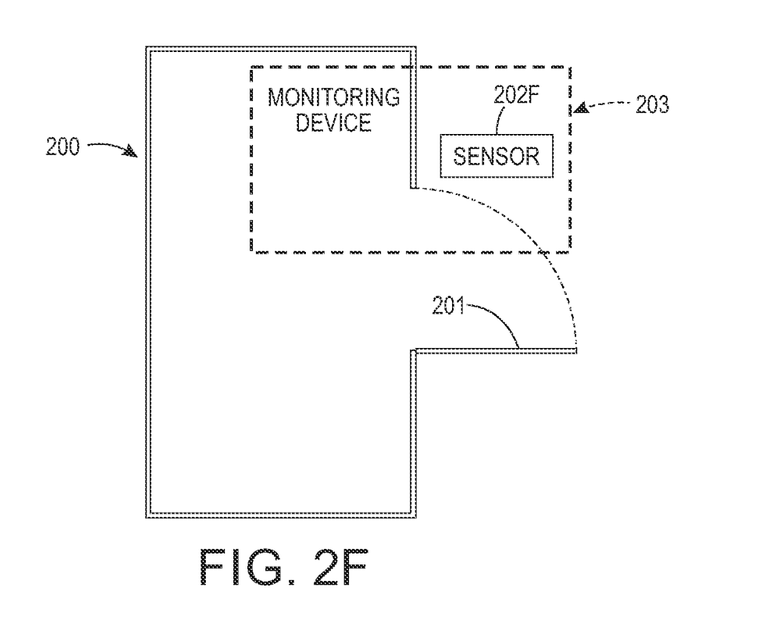
FIG. 2F illustrates a graphical representation of the remote CRM system detection monitoring device in accordance with the embodiments.

Whether sensing is accomplished by detection of the door 201 as illustrated in FIG. 2A-FIG. 2D, or another portal as previously described, or by detecting an object or person as illustrated in FIG. 2E and FIG. 2F, monitoring device receives an input signal from at least one sensor to enable control of the managed system.

Figure 3:
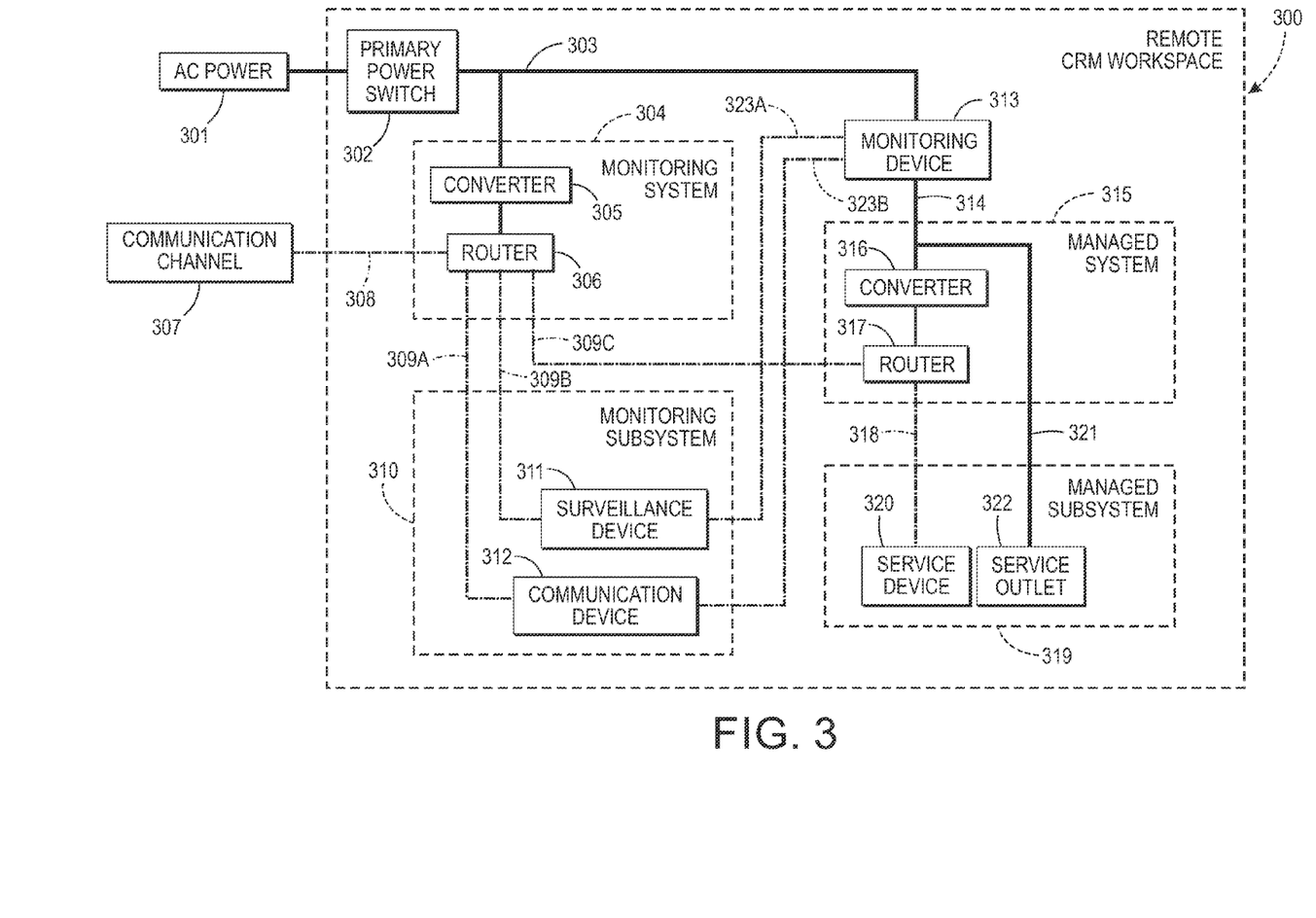
FIG. 3 illustrates a schematic view of the remote CRM system in accordance with the embodiments.

Referring to FIG. 3, operation of monitoring system 304, monitoring subsystem 310, managed system 315 and managed subsystem 319 will be explained in the context of remote CRM workspace 300. As illustrated, primary power switch 302 controls power from AC power 301 to power source 303. AC power 301 is shown as an external power source, but could be integrated with the workspace avoiding the need for external power. Primary power switch 302 is contemplated to be a simple mechanical switch and/or secure switch utilizing authentication systems and methods to restrict access to the power signal transmitted on power conduit 303. Monitoring system 304 is powered by power conduit 303 enabling operation of its devices. Exemplary monitoring system 304 includes a converter 306 that provides alternating current to direct current power conversion for network router 306, which is capable of forwarding data packets between multiple communication devices. Additionally, managed system 315 includes a converter 316 that provides alternating current to direct current power conversion for network router 317, as illustrated. The type of device to facilitate transmission of data by the monitoring system 304 and managed system 315 is not limited by these embodiments.

The monitoring system 304 router 306 of FIG. 3 provides a data conduit between communication channel 307, using communication link 308, and monitoring subsystem 310, using communication links 309A and 309B, and managed system 315, using communication link 309C. Communication channel 307 is shown as an external source, which could be comprised of a hardwired data cable or a wireless data transmission device. Standard operation of the system will now be described. During standard operation of the remote CRM workspace 300, primary power switch 302 is active thereby providing power from AC power 301 to power conduit 303 and monitoring system router 306 thereby making it active and available for access to the communication channel 307, using communication link 308. Additionally, monitoring system 304 is capable of serving other devices and systems such as monitoring subsystem 310 and managed system 315. Monitoring device 313 is also active as power from power conduit 303 is provided. As illustrated in FIG. 3, devices served by monitoring system 304 include devices such as surveillance device 311, using communication link 309B, and communication device 312, using communication link 309A. Surveillance device 311, provides a mechanism to visually and audibly observe the workspace activity. Common devices capable of providing surveillance include computers, cameras and microphones. Communication device 312 provides an appliance enabling communication across the active network. Device such as a computer or network-enabled phone, also known as a voice over IP, provide voice and video services over a network. While only one connection from router 306 to monitoring subsystem 310 is shown, those skilled in the art recognize multiple connections are feasible between router 306 and monitoring subsystem 310 thus providing more than one surveillance device 311 and/or more than one communication device 312. The devices of monitoring subsystem 310 provide the ability to detect the state of monitoring device 313 and transmit an appropriate signal using one or more of conduit 323A or 323B thus allowing monitoring subsystem 310 to communicate the status of monitoring device 313 through communication channel 307 for data logging, communication management and/or call management. Additionally functionality is enabled using conduit 323A or conduit 323B including controlling the type of data provided to the workspace through the communication channel 307 based on the state of the monitoring device 313. In this embodiment, surveillance device 311 is communicatively coupled to the communication channel 307 through conduit 308, router 306 and conduit 309B, and/or communication device 312 is communicatively coupled to the communication channel 307 through conduit 308, router 306 and conduit 309A. Either or both of these communication paths enable the CRM management system 102 to detect the condition of monitoring device 313 to manage the type of information provided to the remote CRM workspace 300 through communication channel 307. As a example, if CRM management system 102 is provided with a signal from remote CRM workspace 300 indicating monitoring device 313 detects a breach of the remote CRM workspace 300, CRM management system 102 prevents access to sensitive information by closing a window or application running on service device 320. CRM management system 102 is capable of other actions to restrict access to sensitive information such as disabling audio and/or video provided to the managed subsystem 319.

Additionally, standard operation allows monitoring device 313 to enable power to managed system 314 such that managed system 315, served by monitoring system 304, using communication link 309C, actively serves managed subsystem 319, using communication link 318. Devices in managed subsystem 319 include any network capable service device 320, such as a computer or network-enabled phone or other such devices capable of communicating over a network or any device requiring managed power such as service outlet 322. Exemplary service devices suggested in this embodiment include a network-enabled phone, which also offers connectivity to a computing device. Service device 320 is contemplated to be of the type of device, which provides intensive on-board computing power, or limited on-board computing power and relies on services provided by external server(s), or a hybrid configuration. Other exemplary devices include, but are not limited to: Cisco™ 890 Series Integrated Services Router (as a router); Cisco™ Video Surveillance 2611 IP Dome (as a surveillance device); Cisco™ Unified IP Phone 9971 (as a service device or communication device); and Cisco™ Virtualization Experience Client 2111 (as a service device). These exemplary devices, as well as similar devices, include capability for powering the device over the communication link, known as Power-over-Ethernet (PoE). While only one connection from router 317 to managed subsystem 319 is shown, those skilled in the art recognize multiple connections are feasible between router 317 and managed subsystem 319 thus providing multiple service devices 320.

Interrupted operation will now be described. Upon detection by a sensor associated with monitoring device 313, power is removed from managed system 315 thus disabling network connectivity between monitoring system 304 and managed subsystem 319. Additionally, power to service outlet 322 in managed subsystem 319 is disabled. In the embodiment illustrated in FIG. 2A-FIG. 2D, sensors 202A, 202B, 202C, and 202D detect an open door 201. In the embodiments illustrated in FIG. 2E and FIG. 2F, sensor 202E and sensor 202F detects the presence of an object. In either of these instances, monitoring device 313 isolates power from managed system 315, and as a consequence managed subsystem 319, thereby warranting them inactive.

To further illustrate an embodiment, the flow chart depicted in FIG. 4A will be described. Upon activation of the system in block 400A, power is enabled to the monitoring system and monitoring device thus allowing a door's state to be detected as shown in blocks 401A and 402A. If the state of the door is detected as closed, path 406A is selected by condition block 403A and the managed system is activated as shown in block 407A. Detection of the door continues as illustrated by path 408A. If the condition block 403A determined the door is not closed, path 404A is selected and managed system is deactivated as illustrated in block 405A. Active monitoring of the door is continued as shown in path 409A.

Figure 4A:
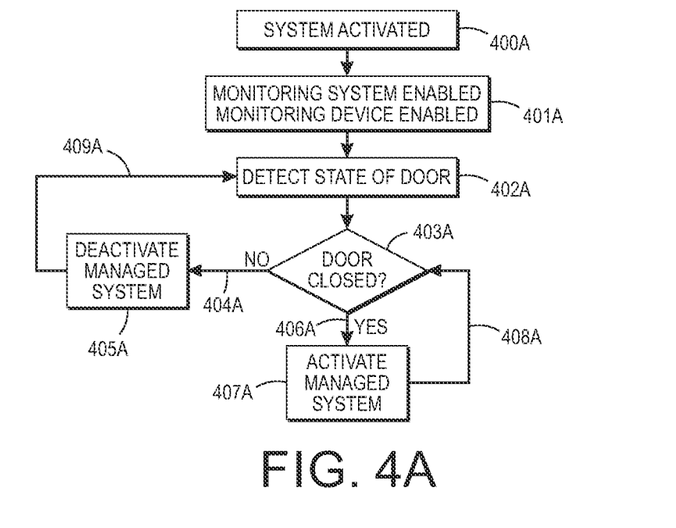
FIG. 4A is a door detection system flowchart according to embodiments of the present invention.
Figure 4B:
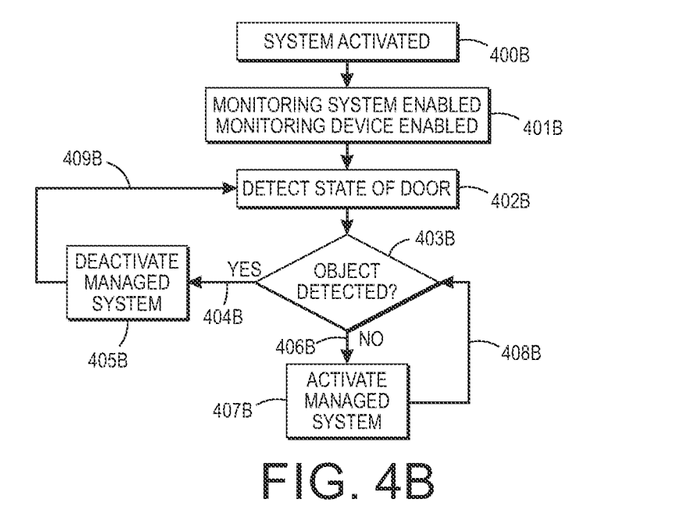
FIG. 4B is an object detection system flowchart according to embodiments of the present invention.

An additional embodiment includes the detection of an object in which operation is illustrated in FIG. 4B. Upon activation of the system in block 400B, power is enabled to the monitoring system and monitoring device thus allowing an object to be detected as shown in blocks 401B and 402B. If an object is not detected, path 406B is selected by condition block 403B and the managed system is activated as shown in block 407B. Continued object detection is enabled as illustrated by path 408B. If the condition block 403B determined an object is present, path 404B is selected and managed system is deactivated as illustrated in block 405B and active monitoring is continued as shown by path 409B.

Embodiments of FIG. 4A and FIG. 4B are capable of conglomeration in part or in whole to create a managed system controlled by door state detection and object detection.

Figure 5:
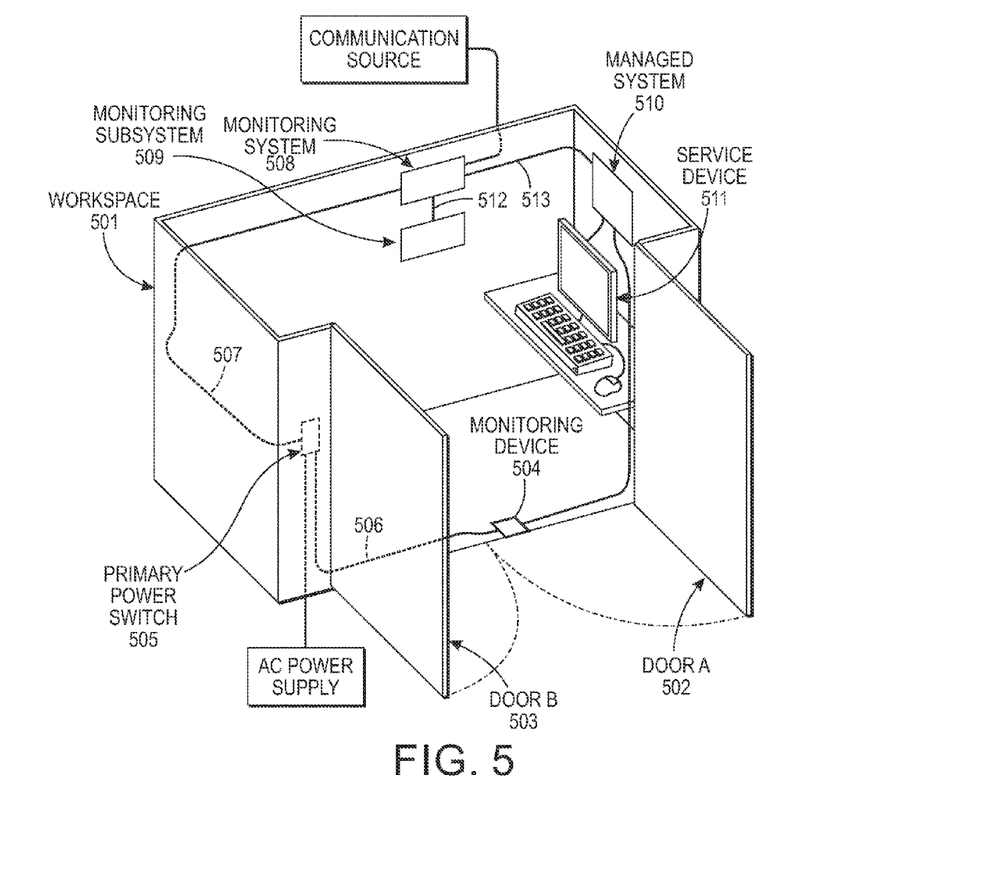
FIG. 5 is a graphical illustration of a dedicated enclosure equipped with a remote CRM workspace system according to embodiments of the present invention.

FIG. 5 illustrates an exemplary implementation of the present invention. Workspace 501 enclosure includes walls, floor, ceiling/roof (not shown) and entry provided by door A 502 and door B 503. A monitoring device 504 is configured such that detection of closures of door A 502 and door B 503 is achieved. AC power is routed into the workspace 501 and through a primary power switch 505. The switched power is routed to the monitoring device 504 by way of connection 506 and to the monitoring system 508 by way of connection 507. Monitoring device 504 is connected to managed system 510 to control service device 511. Monitoring system 508 is provided with network connectivity by an external communication channel as shown and is also connected to monitoring subsystem 509 by use of connection 512 and managed system 510 by use of connection 513. In this embodiment monitoring device 504, monitoring system 508, monitoring subsystem 509 and managed system 510 can be concealed to avoid tampering or unauthorized use of the control devices. Other embodiments utilize a variation of FIG. 5. Such as monitoring device 504 configured to detect the presence of someone near the workspace 501. In this design the monitoring device 504 would be mounted external to workspace 501 to allow of detection of an individual outside of the workspace 501.

The embodiments disclosed are exemplary illustrations of the present invention and not intended to limit the usefulness of the invention. Other uses or combinations are contemplated and claimed. Customer relationship management application is offered as an exemplary use of the present invention. Other applications are contemplated such as personal financial consulting/processing, loan applications, real estate transaction, tax consulting, healthcare/medical consulting, pharmaceutical consulting, proctored examination, legal counseling, employment interview, confidential counseling/coaching, virtual data room for information sharing and other applications which require control of sensitive information.

What is claimed is:

1. A system for maintaining a secure activity workspace, comprising:
a monitoring router, connected to a communication channel, operative to regulate communication over the communication channel, wherein the communication channel operatively connects the monitoring router to a customer relationship management system remote from the secure activity workspace;
a managed router, connected to the monitoring router, operative to enable communication between the monitoring router and at least two service devices, wherein a first service device comprises a thin client that leverages the communication channel to provide a virtualized desktop and a second service device comprises a voice over IP communication device that leverages the communication channel to provide voice services; and
a monitoring device, connected to a power source and the managed router, operative to provide power to the at least two service devices and to detect an unauthorized presence of an individual near the workspace, wherein the monitoring device indicates the presence of the unauthorized individual to the customer relationship management system and the customer relationship management system remotely disables the virtualized desktop provided by the first service device by closing an application running on the first service device based on the indication.

2. The system of claim 1, wherein the monitoring device is an interlock switch interfaced with one of a door, a window or a vent.

3. The system of claim 1, wherein the monitoring device comprises at least one of a communication device and a surveillance device.

4. The system of claim 1, wherein the monitoring devices comprises a sensor that includes at least one of a motion sensor, an optical sensor, an acoustic sensor, or a mechanical sensor.

5. The system of claim 1, wherein the second service device comprises a Power-over-Ethernet device that is powered by the monitoring device over a communication link.

6. A secure activity workspace enclosure with an access port comprising:
a monitoring router, connected to a communication channel, operative to regulate communication over the communication channel, wherein the communication channel operatively connects the monitoring router to a customer relationship management system remote from the secure activity workspace;
a managed router, connected to the monitoring router, operative to enable communication between the monitoring router and at least two service devices, wherein a first service device comprises a thin client that leverages the communication channel to provide a virtualized desktop and a second service device comprises a voice over IP communication device that leverages the communication channel to provide voice services; and
a monitoring device, connected to a power source and the managed router, operative to detect an unauthorized presence of an individual near the workspace enclosure, wherein the monitoring device provides power to the at least two service devices, wherein the monitoring device indicates the presence of the unauthorized individual to the customer relationship management system and the customer relationship management system remotely disables the voice services provided by the second service device by closing an application running on the second service device based on the indication.

7. The secure activity workspace enclosure of claim 6, wherein the monitoring device is an interlock switch interfaced with the access port.

8. The secure activity workspace enclosure of claim 6, wherein the access port is one of a door, a window or a vent.

9. The secure activity workspace enclosure of claim 6, wherein the monitoring device includes a sensor mounted on the activity workspace enclosure.

10. The secure activity workspace enclosure of claim 9, wherein the sensor is at least one of a proximity sensor, a motion sensor, an optical sensor, an acoustic sensor, or a mechanical sensor.

11. The secure activity workspace enclosure of claim 6, wherein the monitoring device comprises at least one of a communication device or a surveillance device.

12. The secure activity workspace enclosure of claim 6, wherein the second service device comprises a Power-over-Ethernet device that is powered by the monitoring device over a communication link.

13. A system for maintaining a secure activity workspace, comprising:
a monitoring router, connected to a communication channel, operative to communicate between the communication channel, and a surveillance device, wherein the communication channel operatively connects the monitoring router to a customer relationship management system remote from the secure activity workspace;
a managed router, connected to the monitoring router, operative to enable communication between the monitoring router and at least two service devices, wherein a first service device comprises a thin client that leverages the communication channel to provide a virtualized desktop and a second service device comprises a voice over IP communication device that leverages the communication channel to provide voice services; and
a monitoring device, connected to a power source, the surveillance device, and the managed router, operative to detect an unauthorized presence of an individual near the workspace through the surveillance device, wherein the monitoring device indicates the presence of the unauthorized individual to the customer relationship management system and the customer relationship management system remotely disables the virtualized desktop provided by the first service device by closing an application running on the first service device based on the indication.

14. The system for maintaining the secure activity workspace of claim 13, wherein the monitoring device is operative to, close a window, disable an audio transmission over the communication channel, or disable video transmission over the communication channel.

15. The system for maintaining the secure activity workspace of claim 13, wherein said first service device is a computer or multimedia device.

16. The system for maintaining the secure activity workspace of claim 13, wherein said monitoring device is at least one of a motion sensor, an optical sensor, an acoustic sensor, or a mechanical sensor.

17. The system for maintaining the secure activity workspace of claim 13, wherein said surveillance device is a computer.

18. The system for maintaining the secure activity workspace of claim 13, wherein the second service device comprises a Power-over-Ethernet device that is powered by the monitoring device over a communication link.

19. A workspace enclosure comprising:
a plurality of doors;
a monitoring device, coupled to a power source, a surveillance device and a communication device, configured to:
detect a state of each of the plurality of doors,
detect a presence of an unauthorized individual near the workspace enclosure, and
provide power to at least two service devices in the workspace enclosure;
a monitoring router, coupled to a communication channel, the surveillance device and the communication device, wherein,
the monitoring router provides access of the communication channel to the at least two service devices,
a first service device comprises a thin client that leverages the communication channel to provide a virtualized desktop and a second service device comprises a voice over IP communication device that leverages the communication channel to provide voice services, and
the communication channel operatively connects the monitoring router to a customer relationship management system remote from the workspace enclosure; and
a managed router, coupled to the monitoring router and the at least two service devices, wherein the access to the communication channel is provided through the managed router and the monitoring router, wherein,
the monitoring device turns off the power to the at least two service devices based on the state of the plurality of doors, and
the monitoring device indicates the presence of the unauthorized individual to the customer relationship management system and the customer relationship management system remotely disables the virtualized desktop provided by the first service device by closing an application running on the first service device based on the indication.

20. The workspace enclosure of claim 19, wherein the second service device comprises a Power-over-Ethernet device that is powered by the monitoring device over a communication link.

* * * * *